United States Patent
Karger et al.

(10) Patent No.: US 10,272,843 B2
(45) Date of Patent: Apr. 30, 2019

(54) MOTOR VEHICLE WITH CARGO AREA FLOOR

(71) Applicant: GM GLOBAL TECHNOLOGY OPERATIONS LLC, Detroit, MI (US)

(72) Inventors: Joerg Karger, Ruesselsheim (DE); Thilo Schaefer, Ruesselsheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 96 days.

(21) Appl. No.: 15/454,964

(22) Filed: Mar. 9, 2017

(65) Prior Publication Data
US 2017/0259746 A1  Sep. 14, 2017

(30) Foreign Application Priority Data
Mar. 9, 2016 (DE) .................. 10 2016 002 885

(51) Int. Cl.
*B60R 5/04* (2006.01)
*B62D 43/10* (2006.01)

(52) U.S. Cl.
CPC ............ *B60R 5/044* (2013.01); *B60R 5/04* (2013.01); *B62D 43/10* (2013.01)

(58) Field of Classification Search
CPC .......... B60R 5/04; B60R 5/044; B62D 43/00; B62D 43/10
USPC ........................................ 296/37.14, 37.16
See application file for complete search history.

(56) References Cited

U.S. PATENT DOCUMENTS

| 4,226,461 A * | 10/1980 | Ackel ............... B60P 3/423 296/37.14 |
| 6,003,921 A * | 12/1999 | Tozuka ............. B62D 43/10 224/42.2 |
| 2015/0251712 A1* | 9/2015 | Craven ............ B62D 43/06 296/37.2 |

FOREIGN PATENT DOCUMENTS

| DE | 2730913 B1 | 11/1978 |
| DE | 2741540 A1 | 3/1979 |
| DE | 3932128 C1 | 11/1990 |
| DE | 10307482 A1 | 9/2004 |
| DE | 102010021571 A | 12/2011 |
| DE | 102012011223 A | 12/2012 |
| DE | 102014005029 A | 11/2014 |
| KR | 100900918 A | 6/2009 |

OTHER PUBLICATIONS

German Patent Office, German Search Report for German Patent Application No. 10 2016 002 885.8 dated Nov. 15, 2016.

* cited by examiner

*Primary Examiner* — Jason S Daniels
(74) *Attorney, Agent, or Firm* — Lorenz & Kopf, LLP

(57) ABSTRACT

A motor vehicle having a cargo area for accommodating cargo and a movable cargo area floor for defining the bottom of the cargo area and supporting cargo on the cargo area floor. The cargo area floor includes a cargo floor support, a covering on the cargo floor support, and at least one stopping element arranged in front of the cargo area floor to limit a forwardly directed motion of the cargo area floor in the longitudinal direction. A section of the covering is arranged between the cargo floor support and the at least one stopping element.

17 Claims, 4 Drawing Sheets

MOTOR VEHICLE WITH CARGO AREA FLOOR

CROSS-REFERENCE TO RELATED APPLICATION

This application claims priority to German Patent Application No. 102016002885.8, filed Mar. 9, 2016, which is incorporated herein by reference in its entirety.

TECHNICAL FIELD

The present disclosure pertains to a motor vehicle with a cargo area.

BACKGROUND

Motor vehicles with seats for transporting passengers also feature a luggage compartment or cargo area for transporting cargo within the luggage compartment. Referred to a longitudinal direction of the motor vehicle, the front side of the luggage compartment is generally defined by a rear section of the backseat and its rear side is defined by a tailgate and a section of the vehicle body and/or the corresponding interior trim panel of the motor vehicle. The luggage compartment is laterally defined by lateral trim panels on the body of the motor vehicle. The bottom of the luggage compartment is defined by a cargo area floor and the cargo area floor serves for supporting cargo on an upper side of the cargo area floor.

DE 27 30 913 B1 discloses a springable fastening element for locking pivotable or removable components, particularly cargo floors for station wagons. The fastening element consists of a one-piece spring that is produced from a plane sheet metal blank. The fastening element is divided into a fastening plate and three adjacently extending spring strips protruding from the fastening plate. The central, essentially U-shaped spring strip features a retaining tab, which is punched out of this spring strip in the region of the second bend—starting from the fastening plate—to lock the component (cargo floor) on a locking bar protruding on the underside of the component and the outer spring strips are supported on the locked component under preload. The first bend of the central spring strip is realized softer than the second bend and serves as pivoting axis when a push button provided on the free end of the central spring strip is pressed to disengage the lock.

DE 39 32 128 C1 discloses a plug-type hinge for a removable cargo floor cover in motor vehicles with a fastening plate, which is fixed on the cargo floor cover and features a downwardly protruding spring tab that cooperates with an opening in a vertical wall of a receptacle frame of the vehicle body in a hinge-like fashion. The cargo floor cover is supported on a horizontal shoulder in the receptacle frame of the vehicle body. The plug-type hinge is realized in the form of a molded plastic part with a central, upper tab that features an inner snap-in lug and a lower projection, as well as two lateral, lower tabs that respectively cooperate with an upper opening in a horizontal wall and a lower opening in a vertical wall of the receptacle frame of the vehicle body. Supporting cams are integrally formed on the lower tabs and rest on a horizontal shoulder in the receptacle frame of the vehicle body.

SUMMARY

The present disclosure provides a motor vehicle with a cargo area, in which rattling noises of the cargo area floor can be inexpensively prevented with little technical effort. In particular, the motor vehicle includes a vehicle body, at least one propulsion engine, such as an internal combustion engine and/or an electric motor, a cargo area for accommodating cargo, and a movable cargo area floor for defining the bottom of the cargo area and supporting cargo. The cargo area floor includes a cargo floor support, a covering on the cargo floor support, and at least one stopping element arranged in front of the cargo area floor to limit a forwardly directed motion of the cargo area floor in the longitudinal direction of the vehicle. A section of the covering is arranged between the cargo floor support and the at least one stopping element. The cargo area floor rests on at least one rear stopping element on a rear end region and/or rear end. The cargo area floor, particularly the cargo floor support, rests directly on the at least one stopping element on a front end region and/or front end of the cargo area floor. The covering is arranged between the cargo floor support and the at least one stopping element. In this way, the covering additionally protects the cargo area floor from rattling. The cargo area floor is arranged between the at least one stopping element on the front end region of the cargo area floor and the at least one rear stopping element on the rear end region of the cargo area floor without any play or freedom of motion.

In this way, rattling noises caused by a shift of the cargo area floor between the at least one stopping element on its front end region and the at least one rear stopping element on its rear end region can be advantageously prevented. A separate elastic element such as a foam material can thereby be advantageously eliminated between the cargo floor support and the at least one stopping element. In this way, the production costs of the motor vehicle can be reduced because the already existing covering on the cargo floor support is also used for preventing rattling noises between the cargo floor support and the at least one stopping element. The corresponding section of the covering can be easily and inexpensively produced in accordance with the required geometry during the production of the covering, for example when the covering is punched out of a blank.

In another embodiment, the at least one stopping element in the form of the at least one front stopping element also serves for supporting an underside of the cargo area floor, particularly the cargo floor support, on the front end and/or the front end region of the cargo area floor, particularly the cargo floor support.

In another embodiment, the at least one stopping element is realized in a hook-shaped and/or U-shaped fashion. In this way, the at least one stopping element can advantageously fulfill the function of a limit stop for limiting the forward motion of the cargo area floor in the longitudinal direction on the one hand and the function of a hinge for pivoting the cargo area floor on the other hand. Since the at least one stopping element has a hook-shaped geometry, the at least one stopping element further prevents an upwardly directed vertical motion of the front end region of the cargo area floor due to the corresponding form-fitting connection with the at least one hook-shaped stopping element.

In a complementary variation, the section of the covering between the cargo floor support and the at least one stopping element is elastic such that the least one section of the covering between the cargo floor support and the at least one stopping element can prevent rattling noises. Due to its elastic properties, the section of the covering between the cargo floor support and the at least one stopping element can prevent rattling noises in a particularly effective fashion. When the cargo area floor is arranged horizontally, the covering preferably is always elastically prestressed due to the geometry of the at least one stopping element and the at least one rear stopping element, as well as the geometry of the cargo area floor. Rattling noises caused by horizontal shifts of the cargo area floor can thereby be prevented. Due to the elastic prestress of the covering and the lacking play or clearance between the cargo floor support and the at least one front stopping element and the rear stopping element, horizontal motions of the cargo area floor do not occur in the normal position, in which the cargo area floor is aligned horizontally to support cargo on the cargo area floor.

In a complementary embodiment, the at least one section of the covering between the cargo floor support and the at least one stopping element is realized in the form of at least one band-shaped strap. The geometry of a band-shaped strap is optimized with respect to its arrangement between the cargo floor support and the at least one stopping element to prevent rattling noises, wherein a band-shaped strap can also be produced very easily during the production of the covering, particularly when it is punched out of a blank.

In another embodiment, the at least one section of the covering between the cargo floor support and the at least one stopping element is realized integrally with the remaining covering. In this way, the at least one section can be very easily produced during the production of the covering, for example by punching a one-piece covering for the cargo floor support out of a blank, such that no additional effort is required to produce this section.

In another variation, the covering is fastened on the cargo floor support in a firmly bonded fashion, particularly with adhesive. The covering is preferably fastened on the cargo floor support in a firmly bonded fashion, particularly with adhesive, on an upper side and on an underside and/or laterally.

In another embodiment, the at least one stopping element is made of metal and/or plastic, wherein the at least one stopping element is particularly formed by the vehicle body or a separate component that complements the vehicle body. A connecting plate is preferably fastened on the at least one stopping element, wherein the connecting plate and the stopping element jointly form a mounting, particularly a metallic mounting, for fastening lashing eyes. Consequently, this mounting serves for fastening lashing eyes on the one hand and features the stopping element on the other hand.

In a complementary embodiment, the at least one section of the covering between the cargo floor support and the at least one stopping element is fastened on the cargo floor support in a firmly bonded fashion, particularly with adhesive. The section is thereby reliably and securely fastened on the cargo floor support in a firmly bonded fashion like the entire covering.

In a complementary variation, the entire covering is realized in one piece. In this way, the covering for the cargo floor support can be very easily produced, for example by punching the covering out of a blank. For example, the blanks are unwound from a roll in the form of a strip.

In another embodiment, the covering is fastened on an upper side and an underside of the cargo floor support and the at least one section of the covering between the cargo floor support and the at least one stopping element is realized in the form of an extension of the covering fastened on the underside of the cargo floor support.

In a complementary embodiment, the motor vehicle includes two stopping elements and two sections of the covering between the cargo floor support and the two stopping elements. In this case, the two stopping elements are particularly suitable for forming a hinge for raising a rear end region of the cargo floor, wherein the pivoting axis of this hinge is aligned in the lateral direction of the motor vehicle and defined by the two stopping elements. The two stopping elements are advantageously formed in the region of the lateral front end of the cargo floor support.

In another embodiment, at least one recess is formed on the upper side of the cargo floor support on the front end of the cargo floor support and an end region of the at least one stopping element and an end region of the section of the covering are arranged between the cargo floor support and the at least one stopping element within the at least one recess.

In a complementary variation, the covering covers the at least one recess such that the end region of the at least one stopping element and the end region of the section of the covering between the cargo floor support and the at least one stopping element are arranged between the lower boundary of the at least one recess formed in the cargo floor support and the covering that covers the at least one recess.

In another embodiment, the covering is realized in the form of a carpet, fabric, felt or foil. The carpet, fabric, felt or foil preferably features an elastic plastic layer on its underside. In another embodiment, the cargo floor support is made of metal and/or wood and/or plastic. The cargo floor support is preferably realized in a plate-shaped fashion and/or rigidly.

In a complementary variation, the cargo area floor can be pivoted about a pivoting axis in the region of the at least one stopping element and/or the cargo area floor can be removed from the remaining motor vehicle.

In another embodiment, the motor vehicle includes at least one rear stopping element for limiting rearward motions of the cargo area floor in the longitudinal direction of the vehicle and for supporting an underside of the cargo area floor, particularly the cargo floor support, on the rear end and/or the rear end region of the cargo area floor, particularly the cargo floor support.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
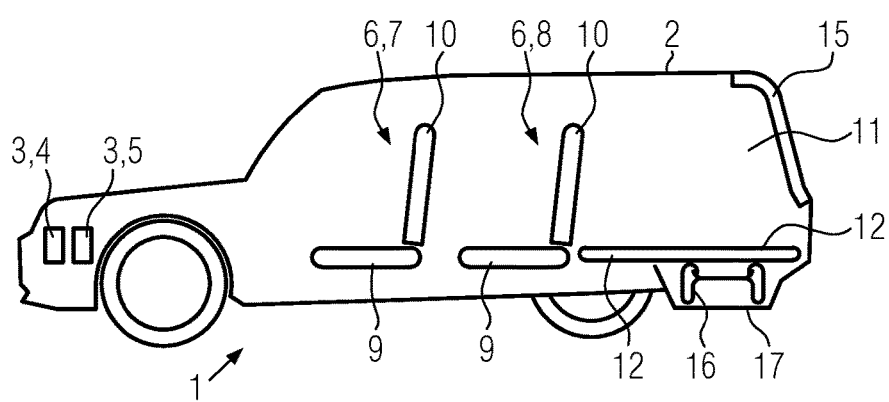
FIG. 1 shows a longitudinally sectioned side view of a motor vehicle.

A motor vehicle 1 illustrated in FIG. 1 features a vehicle body 2 of steel and/or aluminum and/or plastic. The motor vehicle 1 is driven by a propulsion engine 3, namely an electric motor 4 and/or an internal combustion engine 5. The vehicle body 2 defines an interior, in which seats 6, namely front seats 7 and backseats 8, are respectively arranged to accommodate passengers or persons. The seats 6 respectively feature a seat part 9 and a backrest 10. Behind the backrests 8, a luggage compartment 11 is formed between the backrests 8 and a pivotable tailgate 15. The bottom of the luggage compartment 11 or cargo area 11 is defined by a movable cargo area floor 12. A spare tire well 17 is formed in the vehicle body 2 underneath the cargo area floor 12. A spare tire 16 and a (not-shown) vehicle-specific tool kit are arranged in the space between the cargo area floor 12 and the spare tire well 17. The terms luggage compartment 11 and cargo area 11 are synonymous.

The cargo area floor 12 serves for supporting cargo on an upper side of the cargo area floor 12. The cargo area floor 12 is essentially aligned horizontally during its use as cargo area floor 12. Its upper side is formed by a covering 19 in the form of a carpet 20, wherein the covering 19 is fastened on a rigid, plane and plate-shaped cargo floor support 18 in a firmly bonded fashion with an adhesive, namely on an upper side 13 of the cargo floor support 18.

Figure 4:
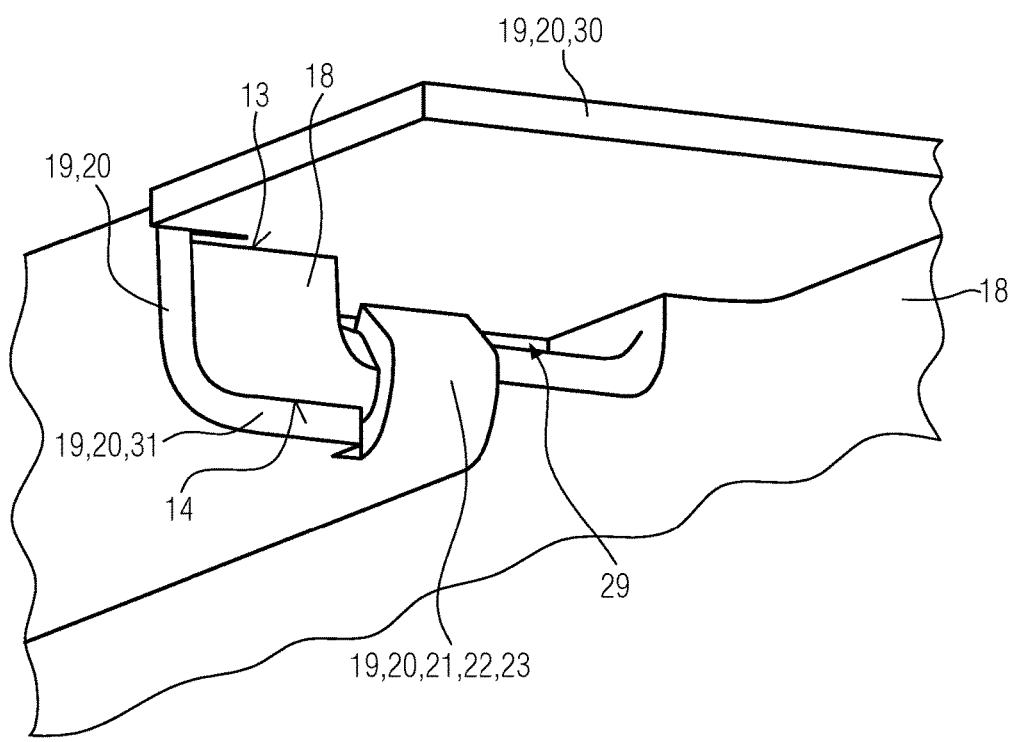
FIG. 4 shows a perspective view of a portion of a front end of the cargo area floor of the motor vehicle according to FIG. 1.

The geometry of the covering 12 is realized in such a way that the covering 19 is also partially fastened on an underside 14 of the cargo floor support 18, as well as on lateral regions of the cargo floor support 18, in a firmly bonded fashion (FIG. 4). The geometry of the covering 19 is therefore realized such that the upper side 13 of the cargo floor support 18 is completely covered by the covering 19 whereas only a portion of the underside 14 is covered and the two lateral ends or lateral flanks of the cargo floor support 18 also are only partially covered by the covering 19. Due to its geometry, the covering 19 is therefore folded around the cargo floor support 18 after it was placed on its upper side 13 such that the two lateral ends of the cargo floor support 18 and the underside 14 are partially covered by the covering 19. The covering 19 is fastened on the cargo floor support 19 in a laminating process, i.e. the covering 19 is fastened on the cargo floor support 18, particularly in a firmly bonded fashion, by adhesive.

Figure 2:
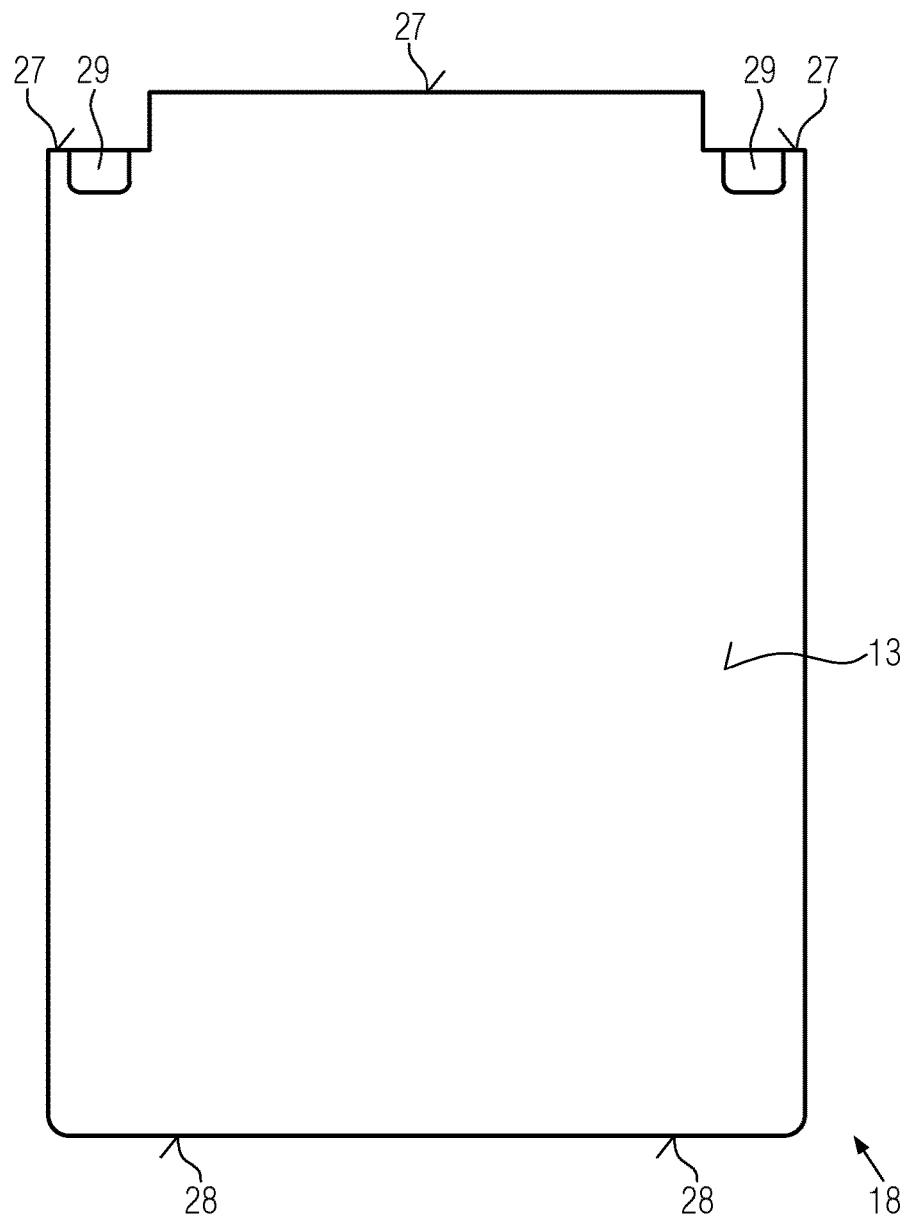
FIG. 2 shows a top view of a cargo floor support of a cargo area floor of the motor vehicle according to FIG. 1.

The cargo floor support 18 (FIG. 2) has a front end 27 or a front end region 27 and a rear end 28 or a rear end region 28. Two recesses 29 are formed in the region of the corners on the front end region 27 such that the thickness of the cargo floor support 19 is smaller in the region of these recesses 29 than outside the recesses 29. Only the upper side 13 is affected by these recesses 29, but not the underside 14.

Figure 3:
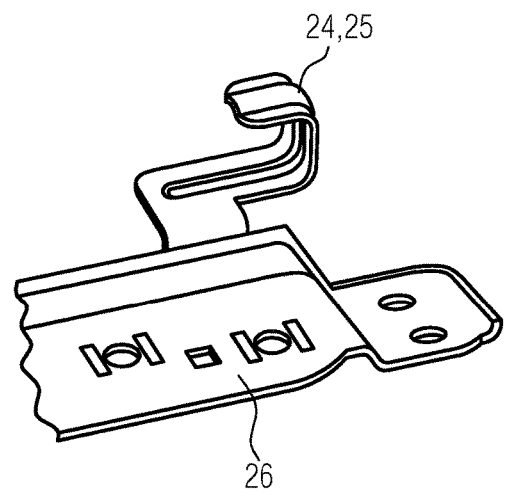
FIG. 3 shows a perspective view of a stopping element of the motor vehicle according to FIG. 1.

At least one not-shown rear stopping element is formed on the rear end 28 or the rear end region 28 of the cargo floor support 18 or the cargo area floor 12 to limit rearward motions of the cargo area floor 12 in the longitudinal direction and to support the underside 14 of the cargo area floor 12, particularly the cargo floor support 18. Furthermore, two front stopping elements 24 are formed in the region of the front end 27 to limit a forward motion of the cargo area floor 12 in the longitudinal direction of the motor vehicle 1 and to support an underside 14 of the cargo floor support 18 on the front end region 27 of the cargo floor support 18. The two front stopping elements 24 (FIGS. 3-5) are respectively formed by a metallic hook 25 and the hook 25 is fastened on a connecting plate 26. The connecting plate 26 with the hook 25 therefore also forms a metallic mounting for fastening not-shown lashing eyes. The motor vehicle 1 features two metallic mountings. The connecting plate 26 is connected to the vehicle body 2 by not-shown connecting elements such as, for example, screws or rivets. In a modification, the front stopping element 24 may also be realized on the vehicle body 2 integrally with the vehicle body 2.

Figure 5:
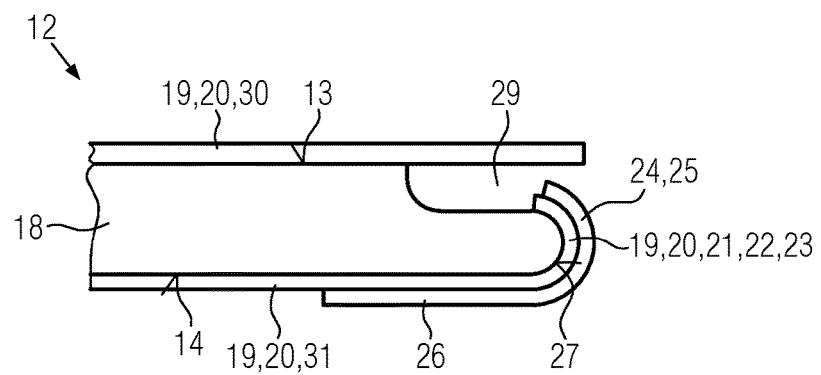
FIG. 5 shows a longitudinal section through the portion of the front end of the cargo area floor and the stopping element of the motor vehicle according to FIG. 1.

On the upper side 13 of the cargo floor support 19, the covering 19 is fastened on the upper side 13 in a firmly bonded fashion in the form of a section 30 of the covering 19, wherein another section 31 of the covering 19 is fastened on the underside 14 of the cargo floor support 18 in a firmly bonded fashion (FIGS. 4 and 5). An additional section 21 in the form of a band-shaped strap 22 is formed on the section 31 of the covering 19, wherein the band-shaped strap 22 forms an extension 23 of the section 31 on the underside 14 of the cargo floor support 18. The section 21 is fastened in the recess 29 in the cargo floor support 18 in a firmly bonded fashion, i.e. the section 21 or the band-shaped strap 22 extends into the recess 29. The section 21 in the form of the band-shaped strap 22 of the covering 19 is arranged between the hook 25 and the rear end 28 of the cargo floor support 18 (FIG. 5). The hooks 25 are partially arranged within the two recesses 29 and therefore serve as limit stops for limiting a forward motion of the cargo area floor 12 in the longitudinal direction, as well as an upward and downward motion of the cargo area floor. The covering 19 in the form of a carpet 20 is furthermore realized elastically in the section 21. The geometry of the cargo area floor 12, as well as the distance between the two front stopping elements 24 and the at least one (not-shown) rear stopping element, is realized in such a way that the front end 27 and the rear end 28 of the cargo floor support 18 are respectively arranged on the two front stopping elements 24 and the at least one rear stopping element without any play or clearance and the two sections 21 are furthermore elastically prestressed, wherein the section 21 of the covering 19 on the front end 27 is merely considered to be a fictitious component of the cargo floor support 18 in this respect. A motion of the cargo floor support 12 is thereby precluded in the normal position, i.e. when the cargo area floor 12 is aligned horizontally to support cargo. The cargo floor support 18 or the cargo area floor 12 can be respectively raised on the rear end 28 of the cargo floor support 18, wherein the two hooks 25 simultaneously act as a hinge due to their geometry. The cargo area floor 12 can thereby be pivoted about a pivoting axis that is horizontally aligned in the lateral direction of the motor vehicle 1 and defined by the two hooks 25 and the recesses 29.

All in all, the inventive motor vehicle 1 provides significant advantages. An elastic component for reducing or for precluding rattling noises of the cargo area floor 12 between the front end 27 of the cargo floor support 18 and the two stopping elements 24 in the form of hooks 25 is formed by the covering 19. In this way, an additional component between the stopping element 24 and the cargo floor support 18 is advantageously eliminated. The geometry of the covering 19 can already be realized accordingly with the strap 22 and the section 31 during the production of the covering, for example when it is punched out of a blank, such that the covering 19 merely must be fastened on the cargo floor support 18 in a firmly bonded fashion during the laminating process to thereby provide a simple protection against rattling noises in the form of the band-shaped strap 22 without the corresponding costs. If no band-shaped strap 22 would be formed on the covering 19, this section 21 of the covering would have to be discarded as waste. In this way, the production costs of the motor vehicle 1 can be significantly reduced and the cargo floor support 18 can at the same time be optimally protected from rattling.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle comprising:
a vehicle body having a cargo area for accommodating cargo;
a movable cargo area floor defining a part of the cargo area and configured to support cargo on the cargo area floor, the cargo area floor including a cargo floor support that has an upper side, wherein at least one recess is formed on the upper side of the cargo floor support on a front end of the cargo floor support;
a covering on the cargo floor support; and
at least one stopping element arranged in front of the cargo area floor for limiting a forwardly directed motion of the cargo area floor in the longitudinal direction;
wherein a section of the covering is arranged between the cargo floor support and the at least one stopping element;
wherein an end region of the at least one stopping element and an end region of the section of the covering are arranged between the cargo floor support and the at least one stopping element within the at least one recess.

2. The motor vehicle according to claim 1, further comprising a connecting plate connected to the motor vehicle, wherein the at least one stopping element comprises an integral part of the connecting plate.

3. The motor vehicle according to claim 1, wherein the at least one stopping element comprises a U-shaped section, and the front end includes a region that is curved and mates with the U-shaped section.

4. The motor vehicle according to claim 1, wherein the section of the covering between the cargo floor support and the at least one stopping element is elastically prestressed and is configured to prevent rattling noises.

5. The motor vehicle according to claim 1, wherein the cargo floor support includes an underside, and wherein the section of the covering between the cargo floor support and the at least one stopping element comprises at least one band-shaped strap, wherein the band-shaped strap forms an extension of the cover on the underside of the cargo floor support.

6. The motor vehicle according to claim 1, wherein the cargo floor support includes an underside, and the at least one stopping element comprises an integral part of a connecting plate that contacts the underside and supports the cargo floor support.

7. The motor vehicle according to claim 1, wherein the covering is fastened on the cargo floor support in a firmly bonded fashion with an adhesive.

8. The motor vehicle according to claim 1, wherein the at least one stopping element is selected from the group consisting of a metal element and a plastic element.

9. The motor vehicle according to claim 1, wherein the section of the covering between the cargo floor support and the at least one stopping element is fastened on the cargo floor support in a firmly bonded fashion with an adhesive.

10. The motor vehicle according to claim 1, wherein the covering comprises a one-piece covering.

11. The motor vehicle according to claim 1, wherein the covering is fastened on an upper side and an underside of the cargo floor support, and the covering between the cargo floor support and the at least one stopping element comprises an extension of the covering fastened on the underside of the cargo floor support.

12. The motor vehicle according to claim 1, further comprising two stopping elements and two sections of the covering between the cargo floor support and the two stopping elements.

13. The motor vehicle according to claim 12, wherein the two stopping elements are formed in the region of a lateral front end of the cargo floor support.

14. A motor vehicle comprising:
a vehicle body having a cargo area for accommodating cargo;
a movable cargo area floor defining a bottom of the cargo area and configured to support cargo on the cargo area floor, the cargo area floor including a cargo floor support that has an upper side, wherein at least one recess is formed on the upper side of the cargo floor support on a front end of the cargo floor support;
a covering on the cargo floor support; and
at least one stopping element arranged in front of the cargo area floor for limiting a forwardly directed motion of the cargo area floor in the longitudinal direction;
wherein a section of the covering is arranged between the cargo floor support and the at least one stopping element;
wherein, an end region of the at least one stopping element and an end region of the section of the covering are arranged between the cargo floor support and the at least one stopping element within the at least one recess;
wherein the covering covers the at least one recess such that the end region of the at least one stopping element and the end region of the section of the covering between the cargo floor support and the at least one stopping element are arranged between a lower boundary of the at least one recess formed in the cargo floor support and the covering that covers the at least one recess.

15. The motor vehicle according to claim 1, wherein the covering is selected from the group consisting of a carpet covering, a fabric covering, a felt covering and a foil covering.

16. A motor vehicle comprising:
a vehicle body having a cargo area for accommodating cargo;
a movable cargo area floor defining a part of the cargo area and configured to support cargo on the cargo area floor, the cargo area floor including a cargo floor support that has a front end, wherein a recess is formed in the cargo area floor support such that a thickness of the cargo floor support is smaller in the recess as compared to outside the recess;
a covering on the cargo floor support; and
a stopping element arranged in front of the cargo area floor for limiting a motion of the cargo area floor in the longitudinal direction, wherein the stopping element includes a hook that extends along the front end and into the recess;

wherein a section of the covering is arranged between the cargo floor support and the hook of the stopping element.

17. The motor vehicle according to claim 16, further comprising a connecting plate connected to the motor vehicle and supporting the cargo floor support, wherein the hook comprises an integral part of the connecting plate.

\* \* \* \* \*